(12) United States Patent
Sterbenz

(10) Patent No.: US 7,934,084 B2
(45) Date of Patent: *Apr. 26, 2011

(54) METHOD AND SYSTEM FOR MODULE INITIALIZATION WITH AN ARBITRARY NUMBER OF PHASES

(75) Inventor: Andreas Sterbenz, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 685 days.

This patent is subject to a terminal disclaimer.

(21) Appl. No.: 11/962,868

(22) Filed: Dec. 21, 2007

(65) Prior Publication Data

US 2009/0164760 A1 Jun. 25, 2009

(51) Int. Cl.
G06F 9/00 (2006.01)
G06F 9/44 (2006.01)
G06F 9/445 (2006.01)
G06F 9/46 (2006.01)

(52) U.S. Cl. ............. 713/1; 713/2; 713/100; 717/120; 717/168; 717/174; 718/102

(58) Field of Classification Search ............... 713/1, 2, 713/100; 717/120, 168, 174; 718/102
See application file for complete search history.

(56) References Cited

U.S. PATENT DOCUMENTS

| 6,681,391 | B1* | 1/2004 | Marino et al. | 717/175 |
| 7,181,746 | B2* | 2/2007 | Perycz et al. | 719/310 |
| 7,254,814 | B1* | 8/2007 | Cormier et al. | 718/106 |
| 7,406,483 | B2* | 7/2008 | Leymann et al. | 717/174 |
| 2005/0102665 | A1* | 5/2005 | Barta et al. | 717/174 |

OTHER PUBLICATIONS

OSGi Service Platform Core Specification, The OSGi Alliance, Release 4, Aug. 2005, pp. 1-268.
OSGi Service Platform Core Specification, The OSGi Alliance, Release 4, Version 4.0.1, Jul. 2006, pp. 1-266.
Sun Microsystems, Inc., JSR-277: Java™ Module System, Version 0.13, Apr. 19, 2007, pp. 1-116.

* cited by examiner

Primary Examiner — Stefan Stoynov
(74) Attorney, Agent, or Firm — Osha • Liang LLP

(57) ABSTRACT

A method for initializing a module that includes identifying a first module for initialization, and performing a plurality of processing phases on the first module and all modules in a dependency graph of the first module. Performing the plurality of processing phases includes, for each module, executing a processing phase of the plurality of processing phases on the module, determining whether the processing phase has been executed on all modules in a dependency graph of the module, and when the processing phase has been executed for all modules in the dependency graph of the module, executing a subsequent processing phase of the plurality of processing phases on the module.

18 Claims, 9 Drawing Sheets

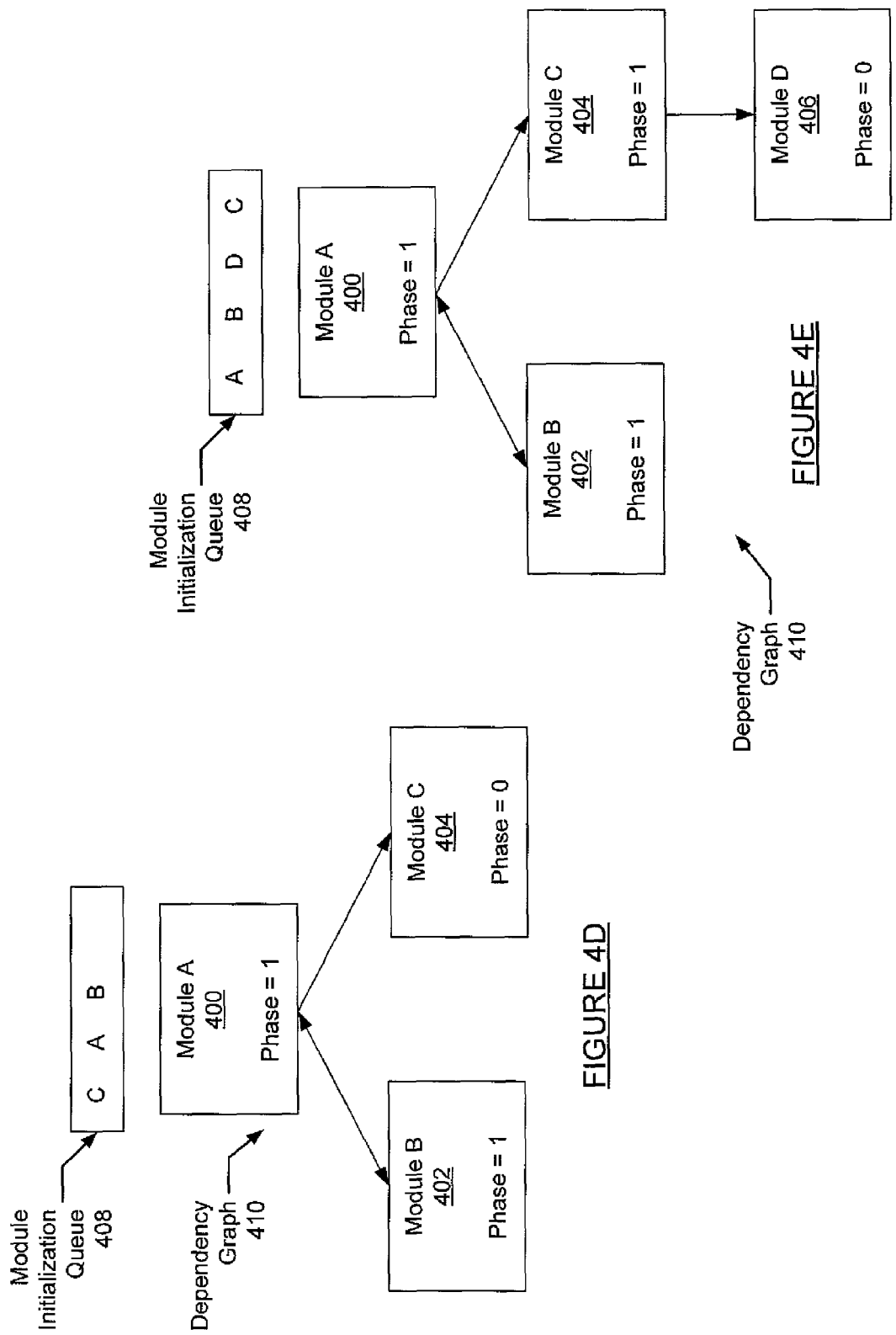

US 7,934,084 B2

METHOD AND SYSTEM FOR MODULE INITIALIZATION WITH AN ARBITRARY NUMBER OF PHASES

CROSS-REFERENCE TO RELATED APPLICATIONS

This application is related to U.S. application "Method and System for Module Initialization" with U.S. application Ser. No. 11/962,949 filed on Dec. 21, 2007, which is incorporated by reference in its entirety.

BACKGROUND OF INVENTION

Software development and support costs are driven by many factors including increasing software complexity and the need to support multiple hardware platforms and operating systems. To help reduce these costs, there is an increasing emphasis on creating modular software solutions to allow reuse of software components (i.e., modules). Many different frameworks to support dynamic use of software components have been developed to meet these needs. Examples of such frameworks include the Java™ Module System (JAM), the OSGi™ Service Platform, the Microsoft® .NET Framework, the Apache Software Foundation Maven, and the Sun Microsystems NetBeans™. Java™ and NetBeans™ are trademarks of Sun Microsystems, Inc. OSGi™ is a trademark of The OSGi Alliance.

While specific implementation details and programming languages supported may vary, module frameworks share a number of common features. Functionality included in a module framework may include a runtime engine, module life cycle management, one or more module repositories, and module version management. This functionality allows "off the shelf" software modules to be reused and integrated into applications coherently and to be dynamically added, updated, and removed from the framework. In addition, modules may dynamically discover and cooperate with each other.

In module frameworks, a given module may be defined to depend on multiple other modules, which may in turn, depend on yet other modules. More specifically, a module may export one or more interfaces that may be imported by other modules. As a result, when a module is instantiated by the framework, some initialization may need to be performed to ensure, among other things, that any modules on which that module depends are present (i.e., that the imported interfaces are available) and can also be instantiated, and that there are no conflicts among these modules (e.g., two modules export a class having the same name). This initialization process typically varies depending on the framework and the composition of the modules.

SUMMARY OF INVENTION

In general, in one aspect, the invention relates to a method for initializing a module. The method includes identifying a first module for initialization, and performing a plurality of processing phases on the first module and all modules in a dependency graph of the first module. Performing the plurality of processing phases includes, for each module, executing a processing phase of the plurality of processing phases on the module, determining whether the processing phase has been executed on all modules in a dependency graph of the module, and when the processing phase has been executed for all modules in the dependency graph of the module, executing a subsequent processing phase of the plurality of processing phases on the module.

In general, in one aspect, the invention relates to a module system. The module system includes module storage configured to store a plurality of module definitions, and a module initialization engine configured to initialize a first module created from a module definition of the plurality of module definitions by performing a plurality of processing phases on the first module and all modules in a dependency graph of the first module. Performing the plurality of processing phases includes, for each module, executing a processing phase of the plurality of processing phases on the module, determining whether the processing phase has been executed on all modules in a dependency graph of the module, and when the processing phase has been executed for all modules in the dependency graph of the module, executing a subsequent processing phase of the plurality of processing phases on the module.

In general, in one aspect, the invention relates to a computer readable medium. The computer readable medium includes executable instructions to initialize a module by identifying a first module for initialization, and performing a plurality of processing phases on the first module and all modules in a dependency graph of the first module. Performing the plurality of processing phases includes, for each module, executing a processing phase of the plurality of processing phases on the module, determining whether the processing phase has been executed on all modules in a dependency graph of the module, and when the processing phase has been executed for all modules in the dependency graph of the module, executing a subsequent processing phase of the plurality of processing phases on the module.

Other aspects of the invention will be apparent from the following description and the appended claims.

BRIEF DESCRIPTION OF DRAWINGS

FIGS. 4A-4J show an example of module initialization in accordance with one or more embodiments of the invention.

DETAILED DESCRIPTION

Figure 1:
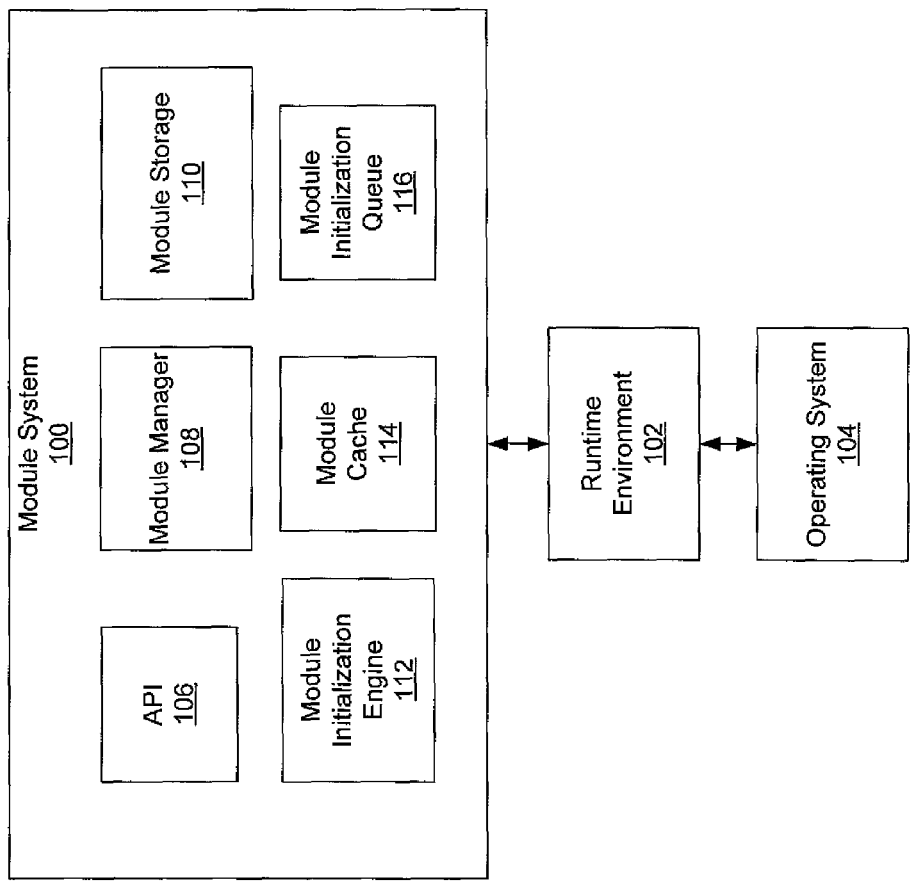
FIG. 1 shows a diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for initializing a module in a module system. More specifically, in one or more embodiments of the invention, when a module is selected for execution, the selected module and all modules on which the selected module directly or indirectly depends (i.e., dependent modules) are initialized by executing a sequence of processing phases on each of these modules (i.e., the selected module and the dependent modules). Each processing phase performs an operation on a module (e.g., identifying modules on which the module depends, verifying constraints, etc.).

Further, each processing phase on each module is followed by a graph walking phase. The graph walking phase walks a graph of the transitive closure of the dependent modules of the module to verify that each of the dependent modules have completed the immediately preceding processing phase. The initialization of the module is not allowed to progress to the next processing phase until all of the dependent modules of that module have completed at least the same processing phase as the module. The originally selected module is successfully initialized when a graph walking phase executed on the selected module indicates that all modules in the dependency graph of the selected module have successfully progressed through all of the processing phases.

FIG. 1 shows a diagram of a system in accordance with one or more embodiments of the invention. Although the various components of the system, i.e., the module system (100), the runtime environment (102), and the operating system (104), are depicted in FIG. 1 as separate components, one of ordinary skill in the art will understand that these components may be combined in whole or in part. For example, in some embodiments of the invention, the module system (100) may be part of or may replace the runtime environment (102). Further, in some embodiments of the invention, the module system (100) may be part of the operating system (104). Accordingly, the specific arrangement of components shown in FIG. 1 should not be construed as limiting the scope of the invention.

As shown in FIG. 1, the system includes a module system (100), a runtime environment (102), and an operating system (104). The operating system (104) provides hardware interfaces and system functionality to software such as the runtime environment (102) and the module system (100) executing on a specific hardware platform (not shown). The operating system (104) may be any suitable operating system including, for example, Solaris™, UNIX®, Linux®, and the operating systems available from Microsoft and IBM. Solaris™ is trademark of Sun Microsystems, Inc. UNIX® is a registered trademark of The Open Group. Linux® is a registered trademark of Linus Torvalds.

The runtime environment (102) provides a software interface for executing applications such as the module system (100) and the modules included in the module system (100). In one or more embodiments of the invention, the runtime environment may be a software library for a specific programming language that provides functionality for interfacing with the underlying operating system (e.g., operation system (104)) when an application (e.g., the module system (100)) is executed. In such embodiments, the module system (100) is implemented in the programming language and the runtime environment (102) may be linked as a part with the compiled code of the module system (100). In one or more embodiments of the invention, the runtime environment may be a virtual machine that abstracts the underlying operating system (104) and hardware platform. Further, in one or more embodiments of the invention, the module system (100) may be implemented in Java and the runtime environment (102) may be a Java Virtual Machine.

The module system (100) is a framework for the development and deployment of module-based applications and libraries. The module system (100) provides, for example, a distribution format (i.e., a module definition) for packaging collections of functions or classes and any related resources along with information (i.e., metadata) describing the module to the framework, a versioning scheme for the modules, and runtime support for discovering, loading, integrity checking, and initializing modules. The module system (100) includes an application programming interface (API) (106), a module manager (108), module storage (110), a module initialization engine (112), a module cache (114), and a module initialization queue (116). Each of these components of the module system (100) is described in more detail below. Further, in one or more embodiments of the invention, the module system (100) may be the Java Module System as described in the Java Specification Request (JSR), JSR-277 available from the Java Community Process website, www.jcp.org.

The API (106) provides an interface for requesting various services from the module system (100). The module initialization queue (116) holds those modules that are currently being initialized by the module system (100). The module queue (116) may be implemented as any suitable data structure including, for example, a linked list, an array, and a circular buffer. The module cache (114) stores fully initialized and instantiated modules and modules that are in the process of being initialized. In one or more embodiments of the invention, the module cache (114) may be implemented in any form suitable for storing modules including, for example, one or more data structures in the memory of a computer system, one or more databases, and one or more files in a file system.

Module storage (110) stores module definitions for the modules configured for use with the module system. In one or more embodiments of the invention, the module definitions stored in module storage (110) may include module definitions provided by a vendor of the module system (100), module definitions developed by one or more users of the module system (100), and/or module definitions from third party vendors. A module definition is used to instantiate (i.e., create an instance of) the module it describes. In one or more embodiments of the invention, a module definition, for example, specifies what classes and resources are provided by a module, what functionality the module imports and exports, and the version of the module. A module definition is described in more detail below in reference to FIG. 2. In one or more embodiments of the invention, module storage (110) may be, for example, one or more databases, file systems, file or database servers, any other suitable storage medium, and combinations thereof.

In one or more embodiments of the invention, module storage (110) may include one or more module repositories. A module repository is a mechanism for storing, discovering, and retrieving module definitions in the module system (100). Module repositories may include a bootstrap repository that exposes core platform module definitions, a global repository that exposes module definitions that may be shared by multiple processes, an application repository that exposes module definitions specific to an application, a URL repository that exposes module definitions stored on a server, and/or other user-defined repositories. A more detailed description of one example of module repositories may be found in JSR-277.

The module manager (108) includes functionality to receive requests from the API (106), interact with other parts of the module system (100) to fulfill the requests, and provide any results of fulfilling the requests to the API (106). The module manager (108) further includes functionality to manage the initialization of modules whose module definitions are stored in module storage (110). For example, in one or more embodiments of the invention, a request is made to the module system (100) through the API (106) to locate a specific module definition in module storage (110) using, for example, the module name or other information that identifies the module. A second request is then made to the module system (100) through the API (106) to request a module corresponding to the module definition from the module manager (108). The module manager (108) first checks the module cache (114) to see if the requested module has already been initialized or is in the process of being initialized. If the requested module is not in the module cache (114), the module manager (108) causes a module object to be created from the module definition and added to the module cache (114) and to the module initialization queue (116).

The module initialization engine (112) includes functionality to initialize the modules in the module initialization queue (116). More specifically, the module initialization engine (112) performs a multi-phase initialization process on each module in the module initialization queue (116). As is explained in more detail in reference to FIG. 3 below, the multi-phase initialization process includes both processing phases and graph walking phases. In one or more embodiments of the invention, in the initialization process, each processing phase on a module is followed by a graph walking phase on the module. In addition, once a specific processing phase is performed on a module, the next processing phase in the initialization process is not executed on the module until all dependent modules of the module have successfully completed at least the specific processing phase. Further, in some embodiments of the invention, the processing phases in the initialization process are required to be executed in a specific order.

While the number of processing phases is not necessarily limited, in one or more embodiments of the invention, the number of processing phases may be predetermined. For example, some embodiments of the invention may include only two processing phases while other embodiments of the invention may include three processing phases, four processing phases, etc. In some embodiments of the invention, the number of processing phases performed may be application or module dependent. For example, the multi-phase initialization process may include some number of required processing phases and allow for one or more optional processing phases. In such embodiments, an optional processing phase may be performed upon request by an application that requests a module from the module system (100) and/or if indicated in a module definition. Thus, the number of processing phases performed on a module and its dependent modules may be dynamically determined at run-time.

A processing phase is a phase in which some initialization operation is performed on a module. An initialization operation may be, for example, identifying those modules on which a module depends and adding those dependent modules to the initialization queue if the dependent modules have not been initialized. An initialization operation may also be, for example, checking for namespace conflicts between dependent modules. In one or more embodiments of the invention, there are two possible outcomes to a processing phase: the module progresses to the graph walking phase or the module is marked to indicate that the processing phase did not complete successfully (e.g., the module is marked as being in an error state).

The graph walking phase that follows each processing phase is used to determine whether the next processing phase can be performed on the module, i.e., that all dependent modules of a module have successfully completed at least the same processing phase as the module. In one or more embodiments of the invention, a graph walking phase walks the graph of the transitive closure of a module's dependent modules to verify that each of the dependent modules has successfully completed at least the same processing phase as the module.

In one or more embodiments of the invention, there are four possible outcomes of a graph walking phase: 1) if any processing phase was not successfully completed on a dependent module, the module is marked to indicate that the module cannot be successfully initialized (e.g., the module is marked as being in an error state) and initialization of the module is aborted; 2) if all dependent modules have completed at least the same processing phase as the module, the next processing phase is performed on the module; 3) if all dependent modules have completed at least the same processing phase as the module and all processing phases have been completed on the module, the module is marked to indicate successful initialization and is removed from the module initialization queue (116); and 4) if all dependent modules have not completed at least the same processing phase, the module is marked to indicate that the processing phase has been completed on the module, the module initialization engine (112) selects the next module in the module initialization queue (116) to process, and the graph walking phase is repeated the next time the module initialization engine (112) selects the module from the module initialization queue (116) for processing.

Figure 2:
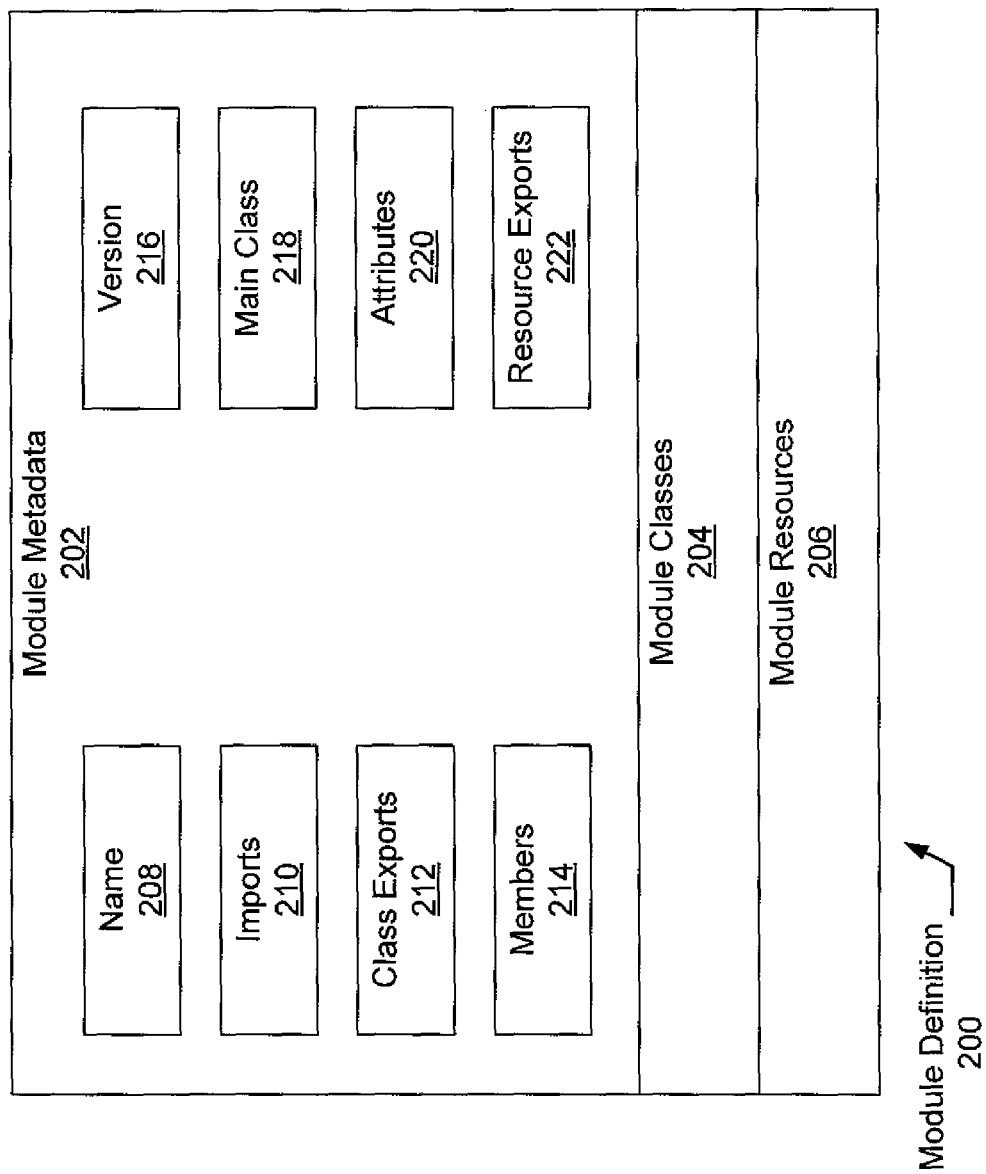
FIG. 2 shows a diagram of a module in accordance with one or more embodiments of the invention.

FIG. 2 shows a module definition (200) in accordance with one or more embodiments of the invention. A module definition (200) may include module metadata (202), module classes (204), and module resources (206). Module classes (204) are the executable code of the module. Module resources (206) are the resources (e.g., data) used by the module. Resources may be in the form of, for example, image files, audio files, text files, or any other data file used by the module.

Module metadata (202) includes information about the module that may be needed for initialization and instantiation of the module and/or for other modules to be able to use the module. In one or more embodiments of the invention, module metadata may include a name (208) of the module, the imports (210) and class exports (212) of the module, and the members (214) of the module. The name (208) may be a text string or any other suitable identifier for the module. The imports (210) specify the modules that are imported by the module. More specifically, the imports (210) identify those modules on which a module instantiated from the module definition (200) directly depends. In one or more embodiments of the invention, the imports (210) are used by the module initialization engine (112 of FIG. 1) to identify the direct dependent modules of a module during a processing phase.

The class exports (212) specify which of the classes in the module classes (204) are visible to other modules, i.e., may be called by other modules. In one or more embodiments of the invention, the class exports (212) may also identify classes that are re-exported by the module, i.e., classes that are imported from another module and then exported by the module. In one or more embodiments of the invention, the class exports (210) are used by the module initialization engine (112 of FIG. 1) to check for naming conflicts between modules during a processing phase. The members (214) identify the classes that are part of the module.

In one or more embodiments of the invention, the module metadata (202) may also include a version (216), a main class (218), attributes (220), and resource exports (222). The version (216) specifies the version of the module represented by the module definition (200). The main class (218) identifies a class of the module classes (204) that is an entry point for the module, i.e., the initial class to be called to start execution of the module. The resource exports (222) identify those resources of the module resources (206) that are exported (i.e., made visible) by the module. In one or more embodiments of the invention, a resource may be identified by a path name of the file storing the resource. In one or more embodiments of the invention, the resource exports (222) may also identify resources that are re-exported by the module, i.e., resources that are imported from another module and then exported by the module.

The attributes (220) are used to specify extensions to the module metadata (202). In more or more embodiments of the invention, an attribute may be a name-value pair of text strings that uniquely identify the attribute and provide a value for the attribute. The attributes (220) may be defined and used by other modules in the module system (100 of FIG. 1). Further, the presence of a particular attribute defined by another module in the module metadata (202) indicates that the module provides a feature of interest to the other module. For example, a service loader module may define a service provider attribute that is to be included in modules that contain service providers. At run time, when a service is requested by the service loader, the module system (100 of FIG. 1) can then discover the available service providers by looking in the module storage (110 of FIG. 1) for those modules that include the service provider attribute in their module metadata.

Figure 3:
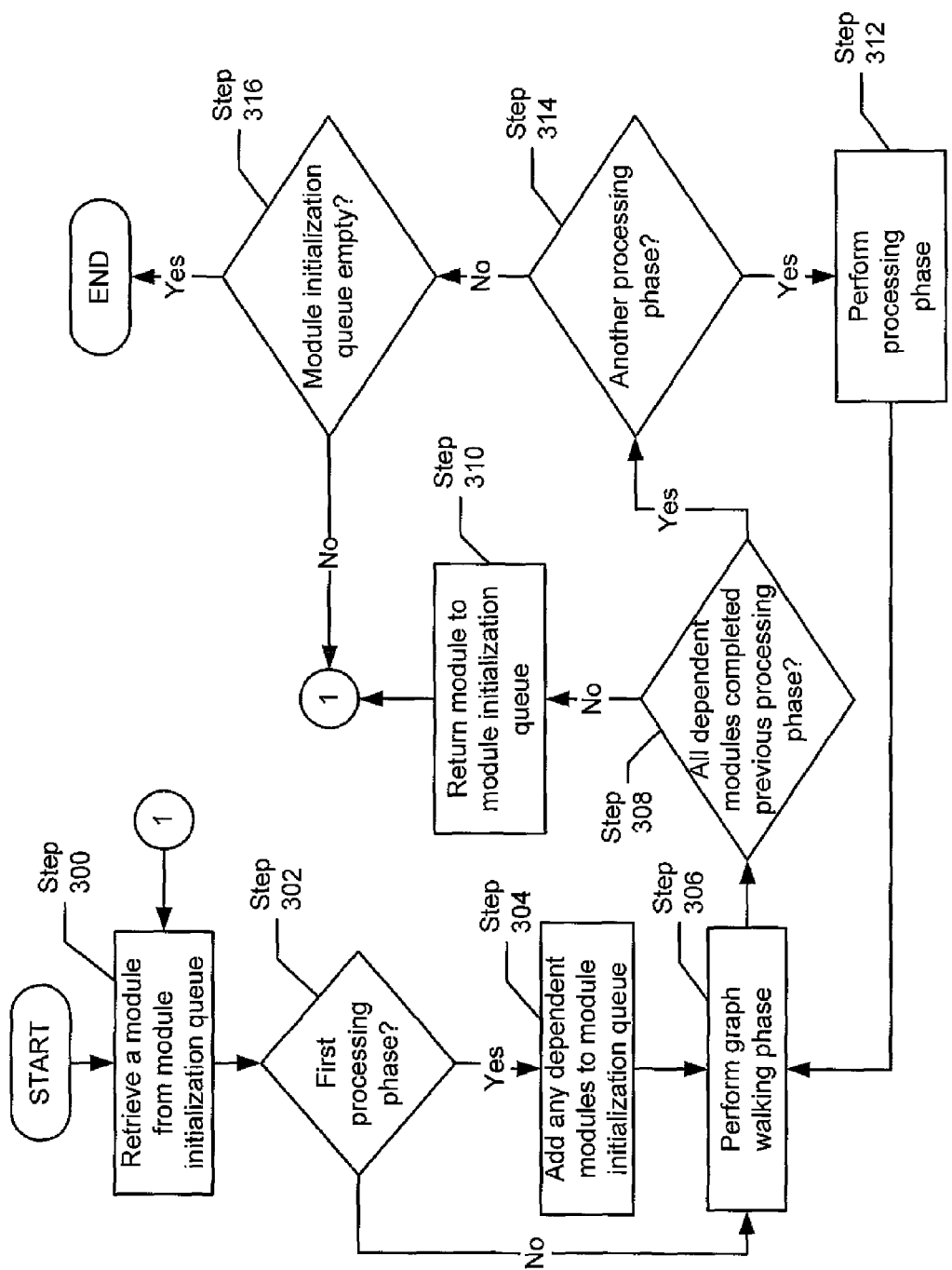
FIG. 3 shows a flowchart of a method for initializing a module in accordance with one or more embodiments of the invention.

FIG. 3 is a flow diagram of a method for module initialization in accordance with one or more embodiments of the invention. In one or more embodiments of the invention, one or more of the steps shown in FIG. 3 may be omitted, repeated, performed in parallel, and/or performed in a different order. Accordingly, the specific arrangement of steps shown in FIG. 3 should not be construed as limiting the scope of the invention. Furthermore, in order to simply the flow diagram, some error checking steps are not explicitly shown. However, one of ordinary skill in the art will understand that such steps may be included. In addition, although the flow diagram is drawn and described to indicate that a module may be removed from a module initialization queue for processing and then returned to the module initialization queue, one of ordinary skill in the art will understand adaptations to the described embodiments in which modules under initialization need not be removed and returned to a queue. For example, array indexing or pointers may be used to move from one module to another in a queue. Accordingly, the focus on one particular approach for selecting modules from a module initialization queue should not be interpreted as limiting the scope of the invention in any way.

As previously mentioned, module initialization is a multi-phase initialization process that is performed on a module and all modules in a dependency graph of the module, i.e., all modules on which the module may directly or indirectly depend. Further, the multi-phase initialization process includes processing phases and graph walking phases that are performed on each of these modules. In one or more embodiments of the invention, each module may include or have associated with it a status indicator that indicates the initialization status of the module. More specifically, the status indicator may indicate which phase of the initialization process has most recently been completed on the module. In one or more embodiments of the invention, each phase is identified by an integer (e.g., 0, 1, 2, 3, 4 . . . ) with the processing phases assigned odd integers, the graph walking phases assigned even integers, and a phase number of 0 indicating that no processing phase has been performed. Accordingly, the status indicator of a module may store the number of the phase most recently completed. For simplicity of explanation, the flow diagram of FIG. 3 may be described below assuming that the phases are so identified. However, other approaches for indicating the initialization status of a module may be used without departing from the scope of the invention and the focus on one particular approach should not be interpreted as limiting the scope of the invention in any way.

In one or more embodiments of the invention, a module that is to be initialized is added to a module initialization queue (e.g., the module initialization queue (116) of FIG. 1). More specifically, in one or more embodiments of the invention, a module definition (e.g., module definition (200) of FIG. 2) may be retrieved from a module repository in module storage (e.g., module storage (110) of FIG. 1), a module object (i.e., a module instance) may be created using the module definition, and the module instance (i.e., the module) may be added to the module initialization queue to be initialized. Further, an initialization status may be associated with the module. More specifically, a status indicator for the module may be set to 0 to indicate that no processing phase has been performed on the module.

The initialization process for the module begins when the module is retrieved from the module initialization queue (Step 300). When a module is retrieved from the module initialization queue, a check is made to determine whether the initial processing phase has been performed on the module (Step 302). In one or more embodiments of the invention, if the status indicator of the retrieved module is 0, the initial processing phase has not been performed.

If the first processing phase has not been performed on the module, that first processing phase is performed (Step 304). In one or more embodiments of the invention, in the initial processing phase, any modules on which the module directly depends are identified. In one or more embodiments of the invention, the dependent modules are the modules imported by the module. Each dependent module that has not been previously initialized or that is not currently undergoing initialization is added to the module initialization queue, with a status indicator of 0. Any of the dependent modules that have already been initialized or are currently being initialized may be stored in a module cache (e.g., the module cache (114) of FIG. 1) with status indicators indicating the initialization phase last completed on those modules. Further, in one or more embodiments of the invention, the status indicator of the module is set to 1 to indicate that the first phase has been completed on the module.

Upon successful completion of the first processing phase, a graph walking phase is performed (Step 306). Further, when a module is retrieved from the module initialization queue that has already had the first processing phase performed on it (Step 302), a graph walking phase is performed (Step 306). The graph walking phase walks the transitive closure of the dependency graph of the module to determine if the dependent modules of the module have progressed sufficiently to allow the next processing phase, if any, to be performed on the module. More specifically, the graph walking phase walks the dependency graph to determine whether the dependent modules have successfully completed at least the last processing phase that was successfully completed on the module. For example, if processing phase 1 has been successfully completed on the module, then the graph walking phase checks the dependent modules to determine if at least processing phase 1 has been successfully completed on those modules. In one or more embodiments of the invention, more processing phases may have been completed on a dependent module than on the module that depends on it.

If all of the dependent modules have completed at least the processing phase previously completed on the module (Step 308), then the initialization process for that module may advance to the next processing phase, if any. If all of the processing phases have been successfully completed on the module (step 314), the status indicator of the module may be set to indicate that the module is completely initialized and the module may be removed from the module initialization queue. In one or more embodiments of the invention, the status indicator is set to the integer representing the final graph walking phase of the initialization process to indicate successful initialization. Further, if the module initialization queue is not empty (step 316), another module is retrieved from the module initialization queue (step 300) and processed.

If all processing phases have not been completed on the module (step 312), the next processing phase is performed on the module. Upon completion of the processing phase, the status indicator of the module is set to indicate completion. In one or more embodiments of the invention, the status indicator is set to the integer representing the processing phase completed. For example, if processing phase 3 is performed, the status indicator is set to 3. Another graph walking phase is then performed on the module (Step 306). The cycle of performing a graph walking phase and a processing phase on the module (Steps 306-314) continues until either there are no more processing phases to be performed (Step 314) or the processing phase performed on the module prior to the graph walking phase has not been completed on the dependent modules (Step 308).

If all of the dependent modules have not completed at least the processing phase previously completed on the module (Step 308), then module is returned to the module initialization queue (310) and another module is retrieved from the module initialization queue for processing (Step 300). In one or more embodiments of the invention, the status indicator of the module is set to indicate that a graph walking phase should be performed on the module the next time the module is retrieved from the module initialization queue.

In one or more embodiments of the invention, a module is successfully initialized when all phases of the multi-phase initialization process have been successfully performed on the module and any modules on which the module directly or indirectly depends. Further, in one or more embodiments of the invention, the number of processing phases in an initialization process is arbitrary. More specifically, the above described methods and systems for initialization do not limit the number of processing phases that may be included in embodiments of the invention. However, in some embodiments of the invention, the number of processing phases may be predetermined.

FIGS. 4A-4J show an example of module initialization in accordance with one or more embodiments of the invention. This example is presented for illustration purposes only and should not be interpreted as limiting the scope of the invention in any way. In the example of FIGS. 4A-4J, the multi-phase initialization process includes two processing phases, phase 1 and phase 3, and two graph walking phases, phase 2 and phase 4. Further, processing phase 1 identifies direct dependent modules of a module and enqueues for initialization any of the identified direct dependent modules that are not already initialized or in the process of being initialized. Processing phase 3 performs name conflict checks on the direct dependent modules of a module. For purposes of this example, the assumption is made that none of the modules are already initialized or in the process of being initialized.

Figure 4B:
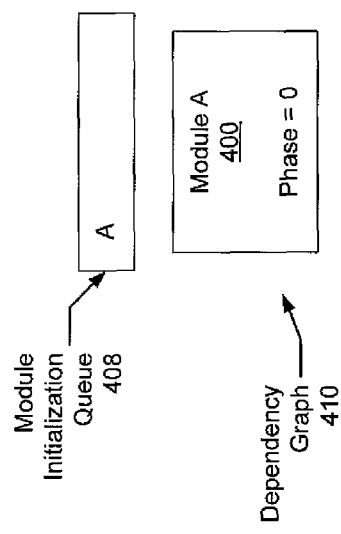
Figure 4C:
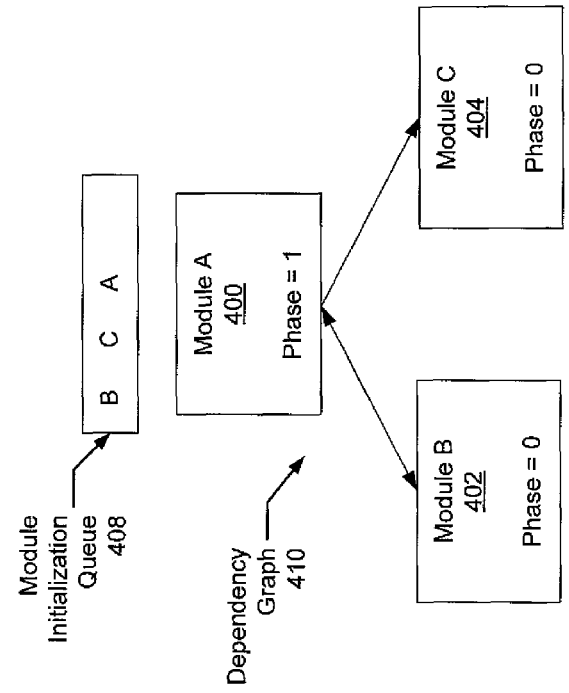
Figure 4A:
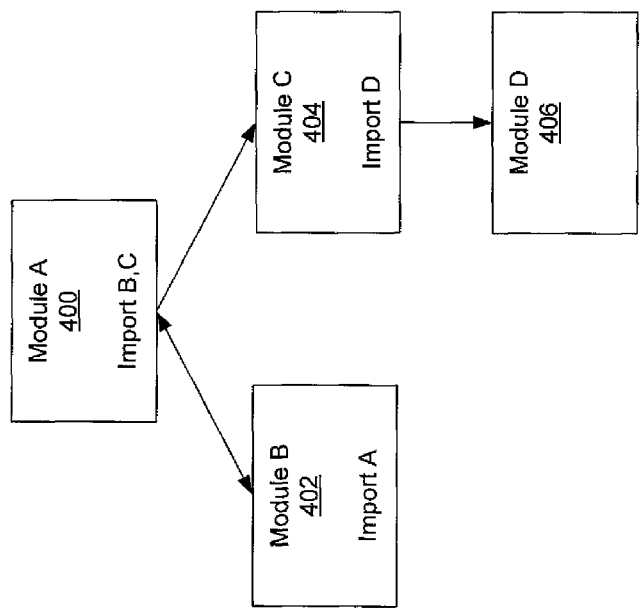

The example in FIGS. 4A-4J illustrates the application of the multi-phase initialization process in initializing module A (400). FIG. 4A shows the dependencies of module A (400). Module A (400) imports module B (402) and module C (404) so module A directly depends on module B (402) and module C (404). Module B (402) imports module A (400) so module B (402) directly depends on module A. Further, the dependency of module B (402) on module A (400) and vice versa creates a cycle in the dependency graphs of module A (400) and module B (402). Module C (404) imports module D (404) so module C directly depends on module D (404) and module A (400) indirectly depends on module D (404). Module D (404) does not import another module so module D has no direct dependencies.

As is shown in FIG. 4B, when initialization of module A (400) is requested, the status indicator, labeled as "Phase" in FIGS. 4B-4J, of module A (400) is set to 0 to indicated that no phase of the initialization process has been performed module A (400). In addition, module A is added to the module initialization queue (408). At this point in the initialization process, the dependent modules of module A (400) have not been identified so the dependency graph (410) of module A (400) includes only module A (400).

Subsequently, the initialization process removes module A (400) from the module initialization queue (408) and phase 1, a processing phase, is successfully performed on module A (400) followed by the first graph walking phase, phase 2. As is shown in FIG. 4C, after phases 1 and 2 are performed, the direct dependent modules of module A (400), i.e., module B (402) and module C (404) have been identified and placed in the module initialization queue (408) to be initialized. Further, the status indicators of both module B (402) and module C (404) have been set to 0 to indicate that no phase of the initialization process has been performed on these modules. In addition, the status indicator of module A (400) has been set to 1 to indicate that phase 1 was successfully completed on module A (400).

After the execution of phase 1, the dependency graph (410) of module A (400) now includes module B (402) and module C (404). When the graph walking phase, phase 2, is performed on the transitive closure of the dependency graph of module A (400), the outcome indicates that phase 1 has not yet been performed on either module B (402) or module C (404). Therefore, module A (400) is not permitted to advance to the next processing phase in the initialization process. Accordingly, module A (400) is put back on the module initialization queue (408).

The initialization process then retrieves the next module, module B (402) from the module initialization queue (408). Phase 1 is successfully performed on module B (402) followed by the first graph walking phase, phase 2. As is shown in FIG. 4D, after phases 1 and 2 are performed, the direct dependent module of module B (402), i.e., module A (400), is identified. Module A (400) is already being initialized so it is already in the module initialization queue (408). Further, the status indicator of module B (402) has been set to 1 to indicate that phase 1 was successfully completed on module B (402).

After the execution of phase 1, the dependency graph (410) now indicates the cyclic dependency relationship between module B (402) and module A (400). When the graph walking phase, phase 2, is performed on the transitive closure of the dependency graph of module B (402), the outcome is that phase 1 has been performed on module A (400) (a direct dependent module of module B (402)) but not on module C (404) (an indirect dependent module of module B (402)). Therefore, module B (402) is not permitted to advance to the next processing phase in the initialization process. Accordingly, module B (402) is put back on the module initialization queue (408).

The initialization process then retrieves the next module, module C (404) from the module initialization queue (408). Phase 1 is successfully performed on module C (404) followed by the first graph walking phase, phase 2. As is shown in FIG. 4E, after phases 1 and 2 are performed, the direct dependent module of module C (404), i.e., module D (406), is identified and added to the module initialization queue (408) for initialization. The status indicator for module D (406) has also been set to 0 to indicate that no phase of the initialization process has been performed on module D (406). Further, the status indicator of module C (404) has been set to 1 to indicate that phase 1 was successfully completed on module C (404).

After the execution of phase 1, the dependency graph (410) now includes module D (406). When the graph walking phase, phase 2, is performed on the transitive closure of the dependency graph of module C (404), the outcome is that phase 1 has not been performed on module D (406). Therefore, module C (404) is not permitted to advance to the next processing phase in the initialization process. Accordingly, module C (404) is put back on the module initialization queue (408).

The initialization process then retrieves the next module, module A (400) from the module initialization queue (408). The status indicator of module A (400) indicates that the last processing phase performed on module A (400) was phase 1, so the first graph walking phase, phase 2, is performed on the transitive closure of the dependency graph of module A (400) again to determine whether module A (400) is permitted to progress to the next processing phase. The outcome of performing the graph walk is that the direct dependent modules of module A (400), module B (402) and module C (404) have completed phase 1 but the indirect dependent module of module A (400), module D (406) has not completed phase 1. Therefore, module A (400) is not permitted to advance to the next processing phase in the initialization process. Accordingly, module A (400) is put back on the module initialization queue (408).

The initialization process then retrieves the next module, module B (402) from the module initialization queue (408). The status indicator of module B (402) indicates that the last processing phase performed on module B (402) was phase 1, so the first graph walking phase, phase 2, is performed on the transitive closure of the dependency graph of module B (402) again to determine whether module B (402) is permitted to progress to the next processing phase. The outcome of performing the graph walk is that the direct dependent module of module B (402), module A (400), has completed phase 1 but one of the indirect dependent modules of module B (402), module D (406) has not completed phase 1. Therefore, module B (402) is not permitted to advance to the next processing phase in the initialization process. Accordingly, module B (402) is put back on the module initialization queue (408).

Figure 4G:
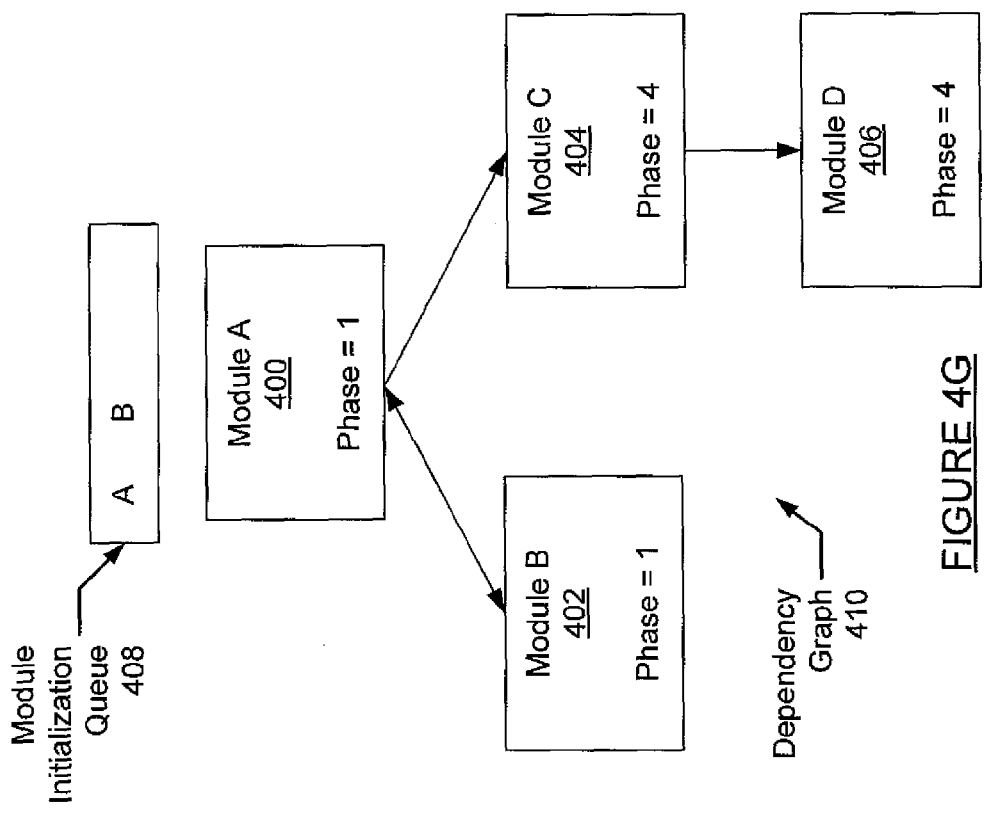
Figure 4F:
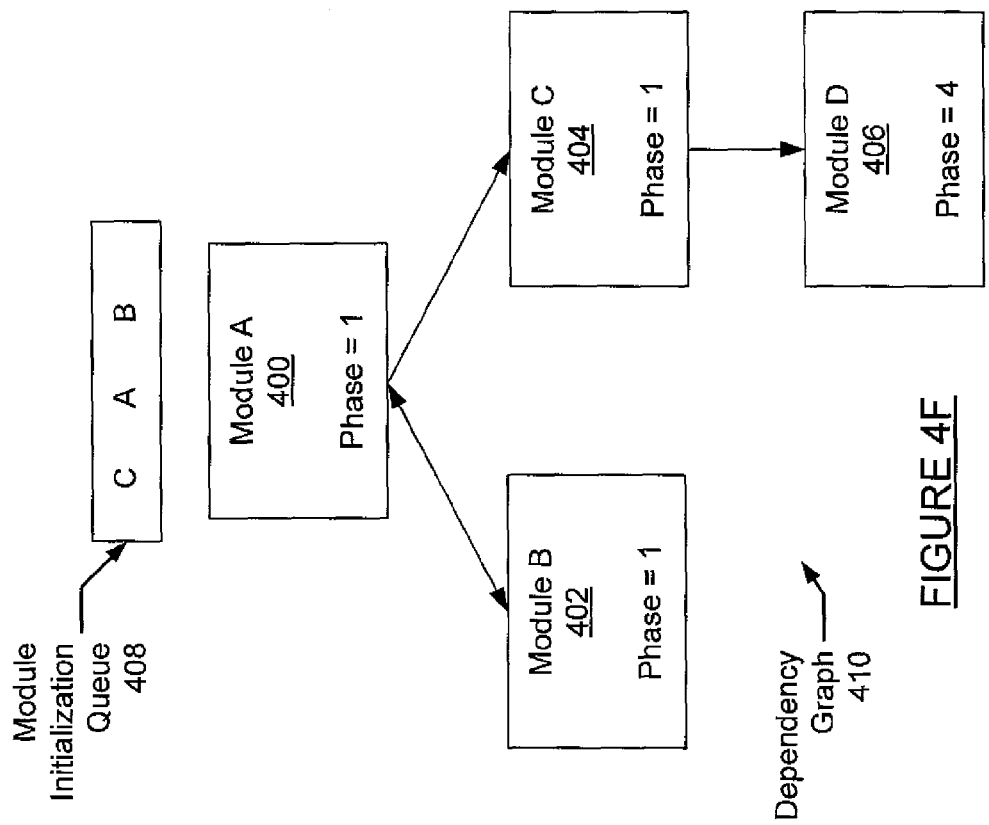

The initialization process then retrieves the next module, module D (406) from the module initialization queue (408). Phase 1 is successfully performed on module D (406) followed by the first graph walking phase, phase 2. As is shown in FIG. 4F, after phase 1 is performed, the dependency graph (410) is unchanged as module D (406) has no direct dependent modules. When the graph walking phase, phase 2, is performed on the transitive closure of the dependency graph of module D (406), the outcome is clearly that phase 1 has been performed on all dependent modules of module D (406) as module 1) (406) has no dependent modules. Therefore, module D (406) is permitted to advance to the next processing phase in the initialization process, phase 3.

Phase 3 is performed on module D (406) in which any direct dependent modules of module D (406) are checked for name conflicts. Upon successful completion of phase 3, the second graph walking phase, phase 4, is performed on the transitive closure of the dependency graph of module D (406). The outcome of the phase 4 graph walk is clearly that phase 3 has been performed on all dependent modules of module D (406). As phase 4 is the last phase of the initialization process, the status indicator of module D (406) is set to 4 to indicate successful completion of all phases of the initialization process. Further, module D (406) is not returned to the module initialization queue (408) as module D (406) is completely initialized.

The initialization process then retrieves the next module, module C (404), from the module initialization queue (408). The status indicator of module C (404) indicates that the last processing phase performed on module C (404) was phase 1, so the first graph walking phase, phase 2, is performed on the transitive closure of the dependency graph of module C (404) again to determine whether module C (404) is permitted to progress to the next processing phase. The outcome of the graph walking phase is that the direct dependent module of module C (404), module D (406), has successfully completed the last processing phase performed on module C (404), i.e., phase 1. Therefore, module C (404) is permitted to advance to the next processing phase in the initialization process, phase 3.

Phase 3 is performed on module C (404) in which any direct dependent modules of module C (404) are checked for name conflicts. Upon successful completion of phase 3, the second graph walking phase, phase 4, is performed on the transitive closure of the dependency graph of module C (404). The outcome of the phase 4 graph walk is clearly that phase 3 has been performed on all dependent modules of module C (404). As shown in FIG. 4G, because phase 4 is the last phase of the initialization process, the status indicator of module C (404) is set to 4 to indicate successful completion of all phases of the initialization process. Further, module C (404) is not returned to the module initialization queue (408) as module C (404) is completely initialized.

The initialization process then retrieves the next module, module A (400), from the module initialization queue (408). The status indicator of module A (400) indicates that the last processing phase performed on module A (400) was phase 1, so the first graph walking phase, phase 2, is performed on the transitive closure of the dependency graph of module A (400) again to determine whether module A (400) is permitted to progress to the next processing phase. The outcome of the graph walking phase is that all of the direct and indirect dependent modules of module A (400) have completed the last processing phase performed on module A (400), i.e., phase 1. Therefore, module A (400) is permitted to advance to the next processing phase in the initialization process, phase 3.

Figure 4I:
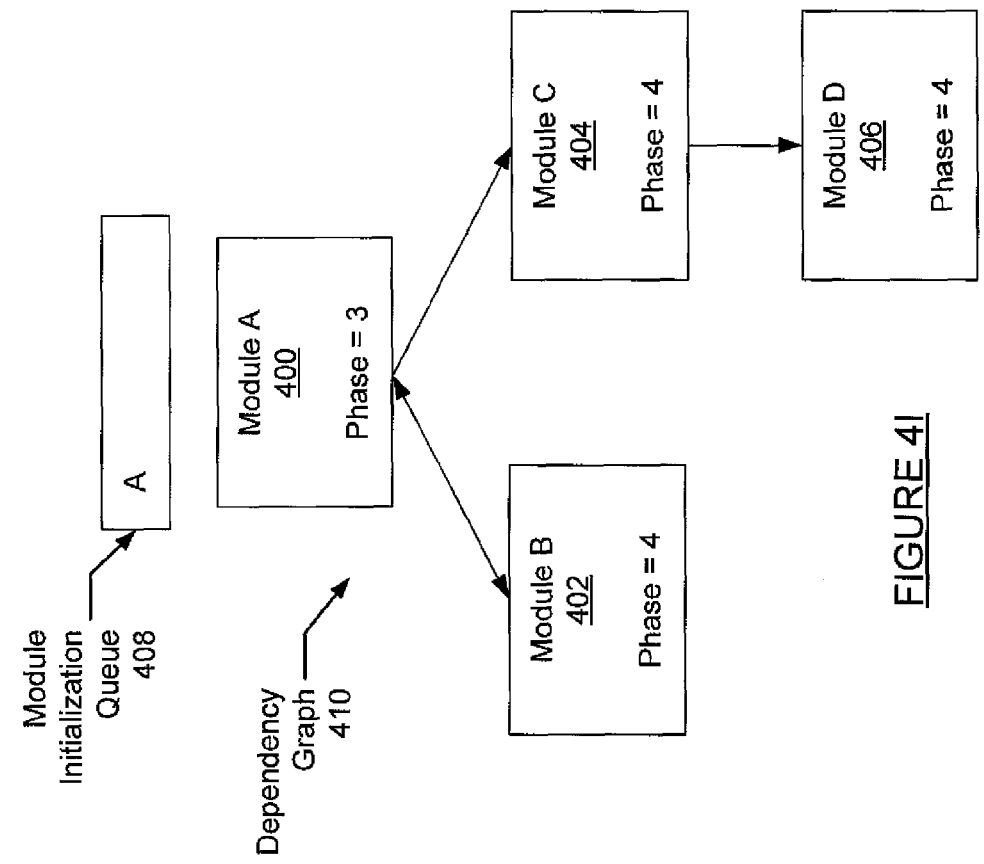
Figure 4H:
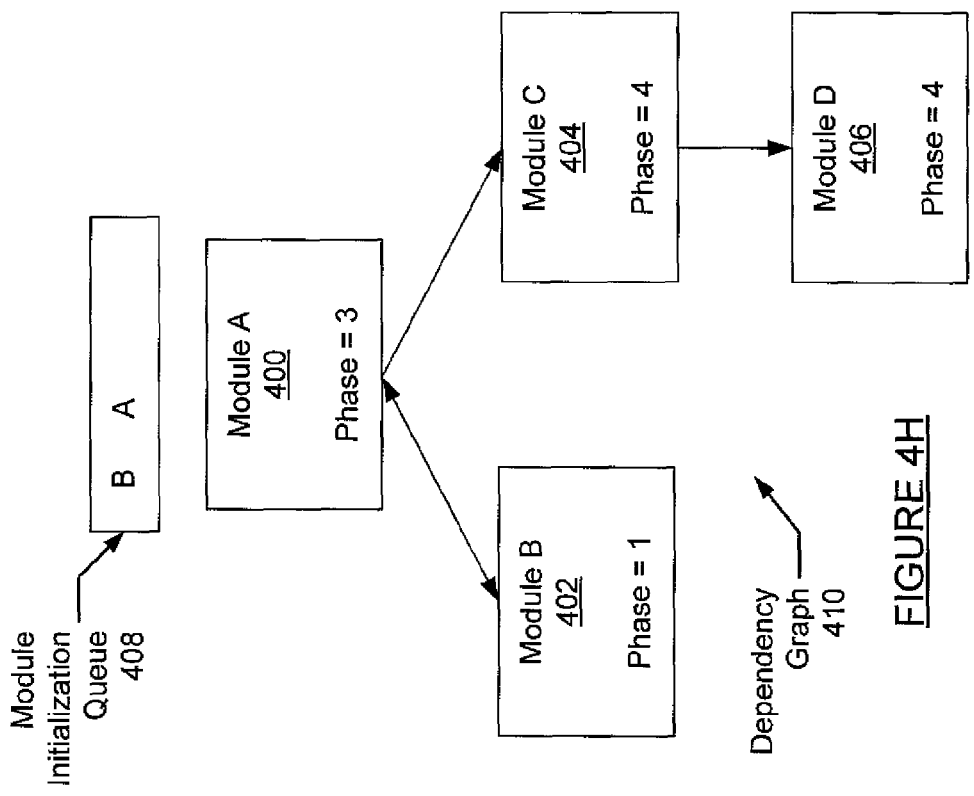

Phase 3 is performed on module A (400) in which any direct dependent modules of module A (400) are checked for name conflicts. Upon successful completion of phase 3, the second graph walking phase, phase 4, is performed on the transitive closure of the dependency graph of module A (400). The outcome of the phase 4 graph walk is clearly that phase 3 has not been performed on all dependent modules of module A (400) as only phase 1 has been performed on module B (402). Therefore, module A (400) cannot progress to completion of the initialization process. As shown in FIG. 4H, the status indicator of module A (400) is set to 3 to indicate successful completion of phase 3 of the initialization process. Further, module A (400) is returned to the module initialization queue (408) as module A (400) is not yet completely initialized.

The initialization process then retrieves the next module, module B (402), from the module initialization queue (408). The status indicator of module B (402) indicates that the last processing phase performed on module B (402) was phase 1, so the first graph walking phase, phase 2, is performed on the transitive closure of the dependency graph of module B (402) again to determine whether module B (402) is permitted to progress to the next processing phase. The outcome of the graph walking phase is that all direct and indirect dependent modules of module B (402) have successfully completed the last processing phase performed on module B (402), i.e., phase 1. Therefore, module B (402) is permitted to advance to the next processing phase in the initialization process, phase 3.

Phase 3 is performed on module B (402) in which any direct dependent modules of module B (402) are checked for name conflicts. Upon successful completion of phase 3, the second graph walking phase, phase 4, is performed on the transitive closure of the dependency graph of module B (402). The outcome of the phase 4 graph walk is clearly that phase 3 has been performed on all dependent modules of module B (402). As shown in FIG. 4I, because phase 4 is the last phase of the initialization process, the status indicator of module B (402) is set to 4 to indicate successful completion of all phases of the initialization process. Further, module B (402) is not returned to the module initialization queue (408) as module B (402) is completely initialized.

Figure 4J:
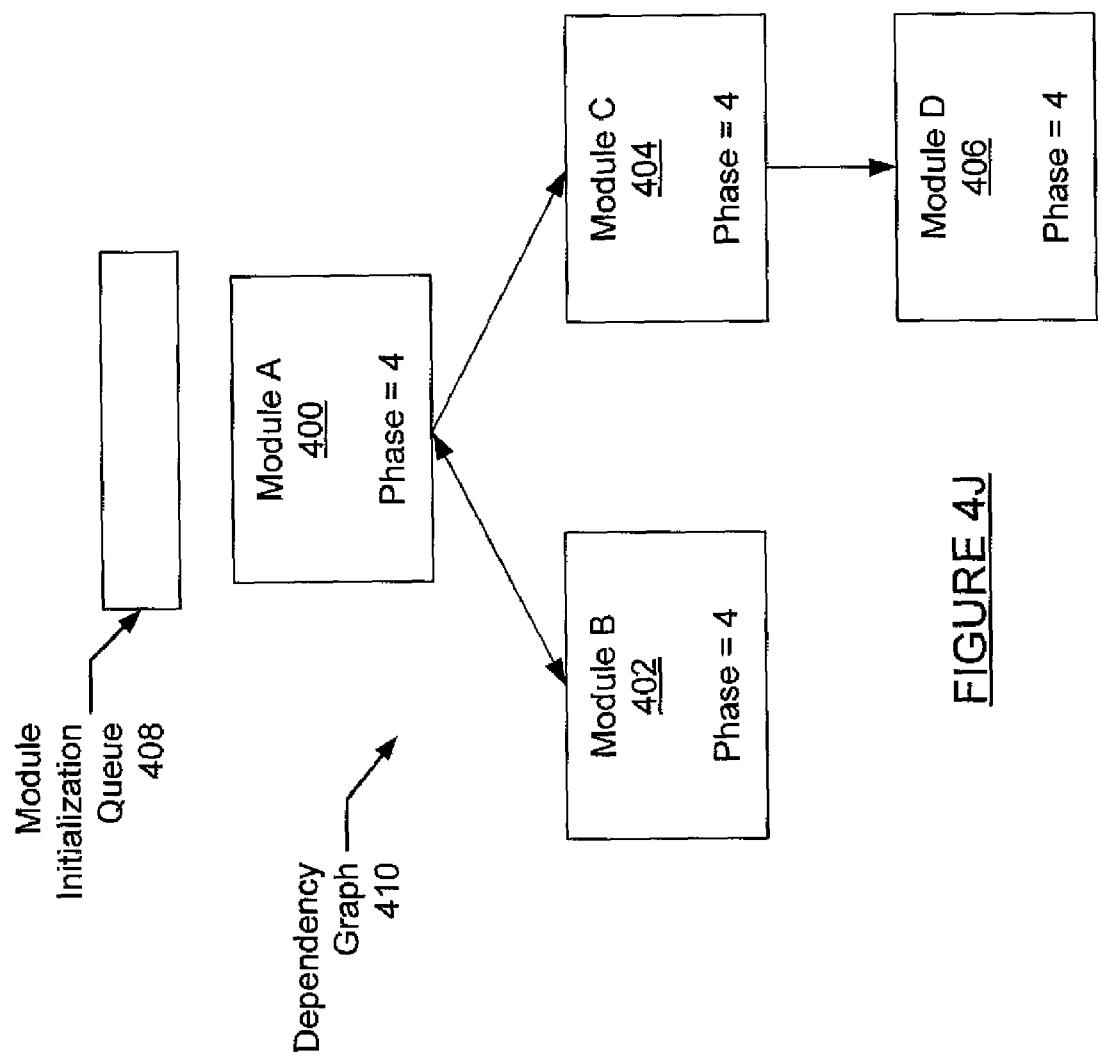

The initialization process then retrieves the next module, module A (400), from the module initialization queue (408). The status indicator of module A (400) indicates that the last processing phase performed on module A (400) was phase 3, so the second graph walking phase, phase 4, is performed on the transitive closure of the dependency graph of module A (400) again to determine whether module A (400) is permitted to progress to completion of the initialization process. The outcome of the graph walking phase is that all direct and indirect dependent modules of module A (400) have successfully completed the last processing phase performed on module A (400), i.e., phase 3. As shown in FIG. 4J, because phase 4 is the last phase of the initialization process, the status indicator of module A (400) is set to 4 to indicate successful completion of all phases of the initialization process. Further, module A (400) is not returned to the module initialization queue (408) as module A (400) is completely initialized.

Figure 5:
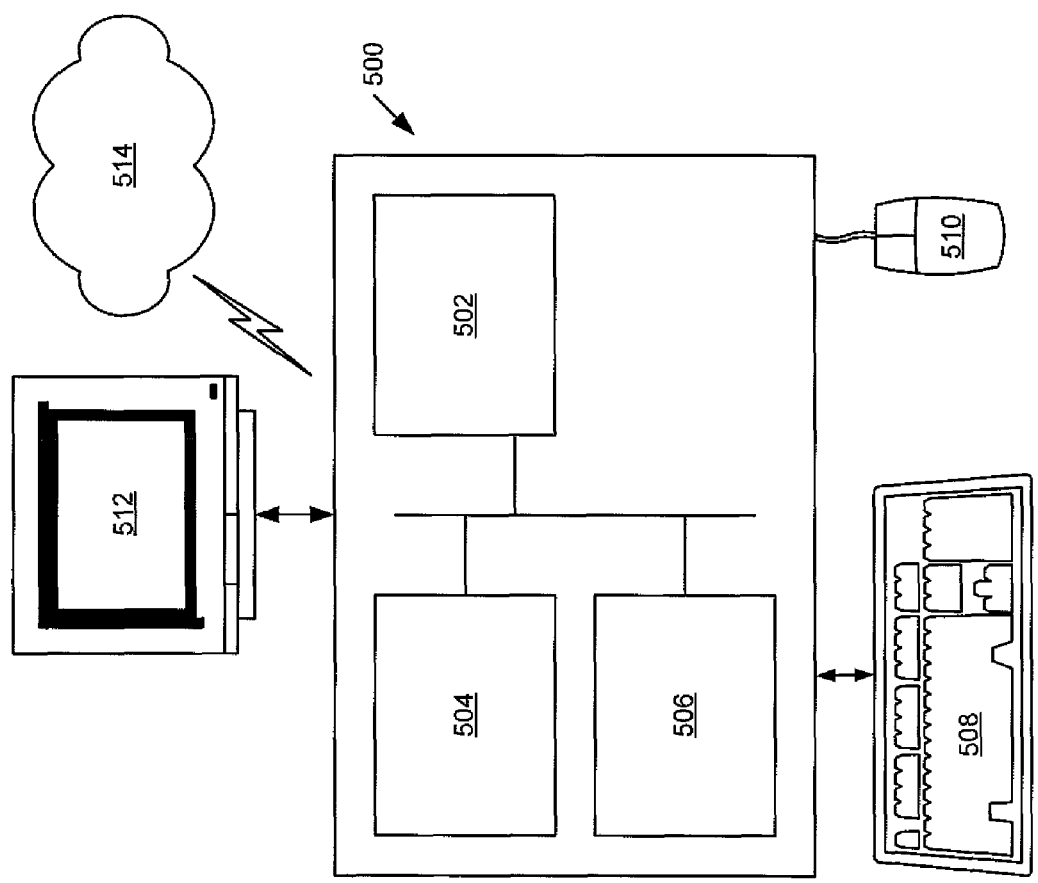
FIG. 5 shows a diagram of a computer system in accordance with one or more embodiments of the invention.

Embodiments of the invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) may be connected to a network (514) (e.g., a local area network (LAN), a wide area network (WAN) such as the Internet, or any other similar type of network) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (e.g., module system, module storage, module cache, etc.) may be located on a different node within the distributed system. In one embodiment of the invention, the node may be a computer system. Alternatively, the node may be a processor with associated physical memory. The node may alternatively be a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for initializing a module comprising:
   identifying a first module for initialization; and
   performing a plurality of processing phases on the first module and all modules in a dependency graph of the first module, wherein the performing comprises, for each module:
      executing a processing phase of the plurality of processing phases on the module;
      determining whether the processing phase has been executed on all modules in a dependency graph of the module; and
      when the processing phase has been executed for all modules in the dependency graph of the module, executing a subsequent processing phase of the plurality of processing phases on the module.

2. The method of claim 1, wherein determining whether the processing phase has been executed further comprises:
   walking the dependency graph of the module to determine an initialization status of each of the modules in the dependency graph, wherein the initialization status indicates which processing phase of the plurality of processing phases was last performed on a module.

3. The method of claim 1, wherein the dependency graph of the module is a transitive closure of a directed cyclic graph of modules on which the module depends.

4. The method of claim 1, wherein executing the processing phase further comprises:
   identifying all modules on which the module directly depends.

5. The method of claim 4, further comprising adding the identified modules to an initialization queue.

6. The method of claim 1, wherein executing the processing phase further comprises:
   performing a conflict check on all modules upon which the module directly depends.

7. The method of claim 1, wherein performing the plurality of processing phases further comprises:
   selecting the module from an initialization queue, wherein the initialization queue comprises modules in the dependency graph of the first module.

8. The method of claim 1, wherein performing the plurality of processing phases further comprises:
   when the processing phase has not been executed on a second module in the dependency graph of the module, executing the processing phase on the second module.

9. The method of claim 1, wherein performing the plurality of processing phases further comprises:

setting an initialization status of the module to indicate an error when the processing phase does not complete successfully.

10. A module system comprising:
module storage configured to store a plurality of module definitions; and
a module initialization engine configured to initialize a first module created from a module definition of the plurality of module definitions by:
performing a plurality of processing phases on the first module and all modules in a dependency graph of the first module, wherein the performing comprises, for each module:
executing a processing phase of the plurality of processing phases on the module;
determining whether the processing phase has been executed on all modules in a dependency graph of the module; and
when the processing phase has been executed for all modules in the dependency graph of the module, executing a subsequent processing phase of the plurality of processing phases on the module.

11. The system of claim 10, wherein determining whether the processing phase has been executed further comprises:
walking the transitive closure of a dependency graph of the module to determine an initialization status of each of the modules in the dependency graph, wherein the initialization status indicates which processing phase of the plurality of processing phases was last performed on a module.

12. The system of claim 10, wherein executing the processing phase further comprises:
identifying all modules on which the module directly depends.

13. The system of claim 10, wherein executing the processing phase further comprises:
performing a conflict check on all modules upon which the module directly depends.

14. The system of claim 10, wherein performing the plurality of processing phases further comprises:
when the processing phase has not been executed on a second module in the dependency graph of the module, executing the processing phase on the second module.

15. The system of claim 10, wherein performing the plurality of processing phases further comprises:
setting an initialization status of the module to indicate an error when the processing phase does not complete successfully.

16. A computer readable medium comprising executable instructions to initialize a module by:
identifying a first module for initialization; and
performing a plurality of processing phases on the first module and all modules in a dependency graph of the first module, wherein the performing comprises, for each module:
executing a processing phase of the plurality of processing phases on the module;
determining whether the processing phase has been executed on all modules in a dependency graph of the module; and
when the processing phase has been executed for all modules in the dependency graph of the module, executing a subsequent processing phase of the plurality of processing phases on the module.

17. The computer readable medium of claim 16, wherein determining whether the processing phase has been executed further comprises:
walking the dependency graph of the module to determine an initialization status of each of the modules in the dependency graph, wherein the initialization status indicates which processing phase of the plurality of processing phases was last performed on a module.

18. The computer readable medium of claim 16, wherein executing the processing phase further comprises one selected from a group consisting of identifying all modules on which the module directly depends and performing a conflict check on all modules upon which the module directly depends.

* * * * *